US007242729B1

(12) United States Patent
Heistermann et al.

(10) Patent No.: US 7,242,729 B1
(45) Date of Patent: Jul. 10, 2007

(54) SIGNAL DECODING METHOD AND APPARATUS

(75) Inventors: Fritz Heistermann, Hauppauge, NY (US); John Robert Weber, Jr., Northport, NY (US)

(73) Assignee: DGI Creations, LLC, Raleigh, NC (US)

( * ) Notice: Subject to any disclaimer, the term of this patent is extended or adjusted under 35 U.S.C. 154(b) by 65 days.

(21) Appl. No.: 11/113,843

(22) Filed: Apr. 25, 2005

Related U.S. Application Data

(60) Provisional application No. 60/565,501, filed on Apr. 26, 2004.

(51) Int. Cl.
*H03D 3/24* (2006.01)
(52) U.S. Cl. .................... 375/329; 375/376; 329/304; 329/306
(58) Field of Classification Search ............. 375/329; 329/304, 306
See application file for complete search history.

(56) References Cited

U.S. PATENT DOCUMENTS

| 4,379,284 A | * | 4/1983 | Boykin ..................... 375/329 |
| 4,400,688 A | | 8/1983 | Johnston et al. ............ 340/310 |
| 4,470,147 A | * | 9/1984 | Goatcher ................... 375/321 |
| 4,516,079 A | | 5/1985 | York ......................... 329/104 |
| 4,563,650 A | | 1/1986 | York et al. .................. 329/50 |
| 4,583,090 A | | 4/1986 | Eden et al. ............. 340/825.07 |
| 4,709,339 A | | 11/1987 | Fernandes ................. 364/492 |
| 5,317,598 A | | 5/1994 | Cahalan et al. .............. 375/75 |
| 5,553,081 A | | 9/1996 | Downey et al. ............... 371/6 |
| 5,844,949 A | | 12/1998 | Hershey et al. ............ 375/346 |
| 6,101,214 A | | 8/2000 | Hershey et al. ............ 375/200 |
| 6,522,626 B1 | | 2/2003 | Greenwood ................ 370/208 |
| 6,734,784 B1 | | 5/2004 | Lester .................. 340/310.02 |
| 6,977,578 B2 | | 12/2005 | Kline ................... 340/310.01 |

(Continued)

FOREIGN PATENT DOCUMENTS

EP 0 219 618 A1 4/1987

(Continued)

OTHER PUBLICATIONS

Maxim Application Note 686, "QPSK Modulation Demystified" (Oct. 13, 2000), 7 pages, available at: www.maxim-ic.com/an686.

(Continued)

*Primary Examiner*—Temesghen Ghebretinsae
*Assistant Examiner*—Juan Alberto Torres
(74) *Attorney, Agent, or Firm*—The Eclipse Group LLP; Kevin E. Flynn

(57) ABSTRACT

An apparatus and method for use by a receiver in decoding information sent by phase-shift keying over a carrier frequency is disclosed. The method is well suited for use with power line carrier (PLC) applications as it is adapted to appropriately position the sampling window based on a zero crossing of one of the phases of the power line. The method allows for receipt and processing of information on more than one carrier frequency and from transmitters operating on a phase of the power line that is different than the phase used by the receiver to detect the zero crossings of the alternating current at the power grid frequency on the power line. A number of alternative embodiments are included.

20 Claims, 14 Drawing Sheets

U.S. PATENT DOCUMENTS

| | | | |
|---|---|---|---|
| 6,980,091 B2 | 12/2005 | White, II et al. | 340/310.01 |
| 2004/0246108 A1 | 12/2004 | Robertson et al. | 340/310.01 |
| 2005/0083925 A1 | 4/2005 | Bonicatto et al. | 370/389 |

FOREIGN PATENT DOCUMENTS

| | | |
|---|---|---|
| EP | 1 062 731 B1 | 12/2000 |
| WO | WO 00/31934 | 6/2000 |
| WO | WO 01/03323 A1 | 1/2001 |
| WO | WO 01/41383 A2 | 6/2001 |

OTHER PUBLICATIONS

"Designing Systems with the IC/SS Power Line Carrier Chipset", National Semiconductor Application Note 919, National Semiconductor Corporation, 22 pgs., Jan. 1994.

Kevin Wade Ackerman, "Timed Power Line Data Communication", 139 pgs., Jan. 2005. See in particular but not exculsively §§ 2.4 and 3.42.

* cited by examiner

FIG. 6

Total Phase Shift (in degrees): 100    arctan of (Q/I) in degrees: 101.085
Attenuation: 0.567

| Angle in degrees | Sine | Cosine | Negative Sine | Negative Cosine | Sample Data | Data * Sine Sequence | Data * Cosine Sequence | Data * Negative (Sine) Sequence | Data * Negative (Cosine) Sequence |
|---|---|---|---|---|---|---|---|---|---|
| 0.00 | 0.000 | 1.000 | 0.000 | -1.000 | -0.098 | 0.000 | -0.098 | 0.000 | 0.098 |
| 10.00 | 0.174 | 0.985 | -0.174 | -0.985 | 0.000 | 0.000 | 0.000 | 0.000 | 0.000 |
| 20.00 | 0.342 | 0.940 | -0.342 | -0.940 | 0.098 | 0.034 | 0.093 | -0.034 | -0.093 |
| 30.00 | 0.500 | 0.866 | -0.500 | -0.866 | 0.194 | 0.097 | 0.168 | -0.097 | -0.168 |
| 40.00 | 0.643 | 0.766 | -0.643 | -0.766 | 0.284 | 0.182 | 0.217 | -0.182 | -0.217 |
| 50.00 | 0.766 | 0.643 | -0.766 | -0.643 | 0.364 | 0.279 | 0.234 | -0.279 | -0.234 |
| 60.00 | 0.866 | 0.500 | -0.866 | -0.500 | 0.434 | 0.376 | 0.217 | -0.376 | -0.217 |
| 70.00 | 0.940 | 0.342 | -0.940 | -0.342 | 0.491 | 0.461 | 0.168 | -0.461 | -0.168 |
| 80.00 | 0.985 | 0.174 | -0.985 | -0.174 | 0.533 | 0.525 | 0.093 | -0.525 | -0.093 |
| 90.00 | 1.000 | 0.000 | -1.000 | 0.000 | 0.558 | 0.558 | 0.000 | -0.558 | 0.000 |
| 100.00 | 0.985 | -0.174 | -0.985 | 0.174 | 0.567 | 0.558 | -0.098 | -0.558 | 0.098 |
| 110.00 | 0.940 | -0.342 | -0.940 | 0.342 | 0.558 | 0.525 | -0.191 | -0.525 | 0.191 |
| 120.00 | 0.866 | -0.500 | -0.866 | 0.500 | 0.533 | 0.461 | -0.266 | -0.461 | 0.266 |
| 130.00 | 0.766 | -0.643 | -0.766 | 0.643 | 0.491 | 0.376 | -0.316 | -0.376 | 0.316 |
| 140.00 | 0.643 | -0.766 | -0.643 | 0.766 | 0.434 | 0.279 | -0.333 | -0.279 | 0.333 |
| 150.00 | 0.500 | -0.866 | -0.500 | 0.866 | 0.364 | 0.182 | -0.316 | -0.182 | 0.316 |
| 160.00 | 0.342 | -0.940 | -0.342 | 0.940 | 0.284 | 0.097 | -0.266 | -0.097 | 0.266 |
| 170.00 | 0.174 | -0.985 | -0.174 | 0.985 | 0.194 | 0.034 | -0.191 | -0.034 | 0.191 |
| 180.00 | 0.000 | -1.000 | 0.000 | 1.000 | 0.098 | 0.000 | -0.098 | 0.000 | 0.098 |
| Accumulator Totals: | | | | | | 5.025 | -0.985 | -5.025 | 0.985 |
| | | | | | | Q COMPONENT | I COMPONENT | | |

REFERENCE GENERATOR

SIGNAL DECODING METHOD AND APPARATUS

This application claims priority and incorporates by reference co-pending U.S. Provisional Application No. 60/565,501 filed on Apr. 26, 2004 for Signal Decoding Method.

BACKGROUND OF THE INVENTION

Field of the Invention

The present invention pertains to the field of signal processing. More specifically, the present invention pertains to a method of converting an analog signal used as a carrier for a digital bit stream for applications where the transmitter and the receiver can be synchronized. One such application is power line carrier (PLC) where data is carried on a carrier signal over a power line carrying alternating current.

One of the problems with using a carrier frequency to convey information in analog form is that the transmitter and receiver may vary slightly in the way they create and perceive the information carrying carrier frequency. If there is a slight difference for example in the exact frequency generated by the transmitter from the expected frequency at the receiver, this difference complicates the precise discernment of phase angle shifts from one waveform to the next.

When more than one transmitter is connected to the same input of the receiver, it may be advantageous to allow Frequency Multiplexing to allow two or more transmitters each using a different carrier frequency to transmit data at the same time.

One of the objects of the present invention is to provide a method for decoding binary information conveyed by an analog carrier frequency that is more tolerant of minor differences between the exact carrier frequency generated by the transmitter and the expected frequency at the receiver.

One of the objects of the present invention is to provide a method for decoding Frequency Multiplexed transmission so that the method allows the decoding of two or more sets binary information conveyed by different analog carrier frequencies.

One of the objects of the present invention is to allow for the use of multiple transmitters to provide information to a single receiver for decoding without requiring all of the transmitters to be placed on the same phase leg of the tri-phase bus.

These and other advantages of the present invention are apparent from the drawings and the detailed description that follows.

SUMMARY

The present invention is directed to an apparatus and method that satisfies needs previously unmet in the prior art solutions for decoding information sent by phase shift keying over a power line using a carrier signal.

BRIEF DESCRIPTION OF THE FIGURES

FIG. 6 conveys a set of sample data and reference values that can be used to discern the phase shift in the sample data using a set of accumulators or through use of the arctan of the quotient of Q/I.

DETAILED DESCRIPTION

The present invention will now be described more fully hereinafter with reference to the accompanying drawings, in which preferred embodiments of the invention are shown.

Figure 1:
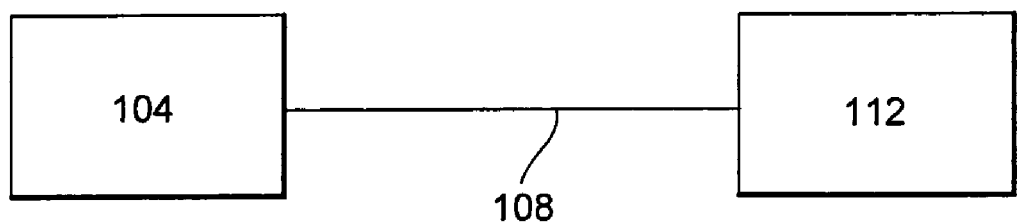
FIG. 1 introduces the prior art concepts of a transmitter, carrier media, and receiver.

A transmitter 104 conveying information across carrier 108 to receiver 112 is shown in FIG. 1. The prior art has developed many solutions to increase the quantity of information conveyed from a transmitter to a receiver. (Note that in many systems, an individual component acts as both a transmitter and a receiver. The use of these terms to simplify the discussion does not preclude the application of this invention to components that act as both a transmitter and a receiver.)

One of the prior art solutions to increase the amount of information conveyed over a carrier is Phase Shift Keying (PSK). In PSK, the phase angle of a carrier signal is purposefully varied to convey binary information. The variance can be from a fixed reference or from the last signal sent. In either case the amount of information that can be sent is a function of the number of discrete phase angle shifts that are used. A system that has two possible shifts (0 degrees and 180 degrees) can convey one binary bit of information per measurement period. A system that recognizes four different phase angle shifts (0 degrees, +90 degrees, 180 degrees, and −90 degrees) can convey two bits of information per measurement period. A four phase angle system is often known as Quadrature Phase Shift Keying (QPSK). As the number of discernable phase shifts increases, so does the amount of information that can be conveyed per measurement period. For example, a system sufficiently sensitive to reliably discern eight different phase shift amounts would be able to send three bits per measurement period.

A second way to increase the amount of information carried by a carrier 108 between a transmitter 104 and a receiver 112 is to use multiple carrier frequencies to have multiple channels of communication over multiple frequencies (Frequency Division Multiplexing). Phase Shift Keying can be used on one or more of the various carrier signals on different frequencies to further increase the capacity of the carrier to convey information.

In order to provide a coherent example, the present invention will be described with respect to a current use of the invention by DIGITALGRID, Inc. in a front end board (FEB) of a receiver that receives information from remote transmitters. The details provided are not limitations on the invention beyond the limitations explicitly present in the claims deemed allowable by the patent examiners that approved them.

An input to the present method is a clock signal created for the Front End Board to allow it to operate synchronously with the transmitter. The creation of the input is described in connection with FIG. 3.

Creation of Clock Pulses for Use by the Front End Board

Figure 3:
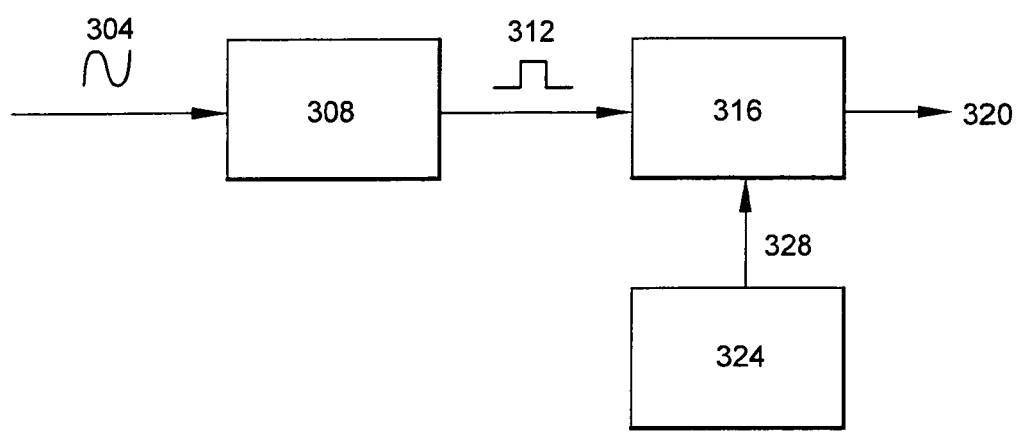
FIG. 3 provides details on the creation of clock pulses in accordance with one embodiment of the present invention.

While the FEB is receiving the carrier signal, the zero crossing of the Hz 60 Hz signal on the power line is detected. As shown in FIG. 3, the 60 Hz signal 304 is monitored by a zero crossing detector 308 which outputs a series of pulses 312. The series of pulses 312 are fed to a delay and adjustment circuit 316 that outputs a set of clock signals 320 with various offsets to the detected zero crossings. As there are two zero crossings per cycle, the frequency of the zero crossing is 120 Hz which is slightly less frequent than one zero crossing every 8.33 milliseconds.

This is not to imply that the invention is limited to 60 Hz applications. Other frequencies can be used provided that the time interval between zero crossings is sufficiently long to allow a reasonable sample of the data carrying carrier frequency. For example, many countries use power systems that operate at various voltages but at a frequency of 50 Hz. The present invention could be extended to that frequency with the proportional timing adjustment for the increase in interval length between zero crossings.

An offset generator 324 can provide an offset input 328 to the delay and adjustment circuit. The offset generator 324 can be a digitally controlled pot or digitally controlled switch. The offset input can be used to provide the proper "gate" to the front end board so as to synchronize the transmitter and receiver so that the transmissions sent from the transmitter based on its local perception of the zero crossing of the power line signal match with the perception of zero line crossing at the receiver. For systems that are sending three sets of data from the transmitter to the receiver (as in the case when information about the three phases of a transformer are conveyed) it is useful to have offsets of zero, 60 and 120 degrees. These delays can be used to allow a decoder to compensate for the use of different phase legs by the transmitter and receiver in the transmission of information on the power line. Thus, a receiver that is using the B phase to provide the zero crossings for timing can be used to decode information conveyed on any of the three phases by using the offset of zero degrees for a B phase transmitter, and other offsets for the other phases. As implemented, one receiver channel could be receiving input from different transmitters operating on two or three different phases of the transformers and be able to process and decode the signals.

The offset input can be used to compensate for the clockwise or counterclockwise generation.

A transmitter sends out a carrier signal over the power lines. As the carrier media 108 used in this particular application is a power line running upstream from a distribution transformer, carrier frequencies between 40 kHz and 70 kHz are well suited. Phase shift keying is used to convey information and in particular differentially modulated Quadrature Phase Shift Keying so that a change in phase from the last signal of: A) 0 degrees is a binary 00, B) 90 degrees is a binary 01, C) 180 degrees is a binary 10, and D) 270 degrees (negative 90 degrees) is a binary 11.

Figure 2:
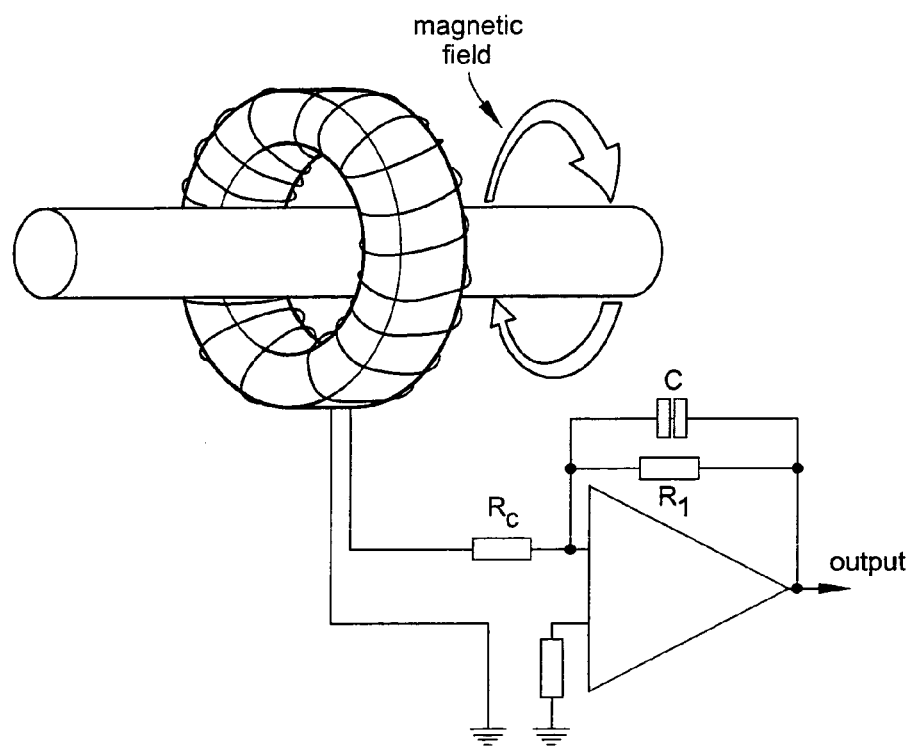
FIG. 2 illustrates a pick-up coil known in the prior art.

The carrier signal is decoupled from the power line by a Rogowski air coil as is known in the art. FIG. 2 provides an illustration of such a prior art coil and pickup circuitry 200.

The front end board (FEB) receives a carrier signal on an input port from the sensor coil. The FEB is adapted to receive input on any of the carrier frequencies used in the particular implementation. In this specific implementation, four carrier frequencies are used. As implemented the FEB can receive and decode all four carrier frequencies at the same time.

After reception on the input port, the signal is amplified by a preamplifier.

After the preamplifier, the signal passes through an active band. pass filter which provides some additional voltage gain. The range for the band pass filter will be a function of the range of carrier frequencies to be used. In one preferred embodiment, the band pass filter is set to pass signals between 42 kHz to 65 kHz.

After the active band pass filter, the signal passes through a post amplifier and conditions the signal for the Analog to Digital conversion (ADC). Conditioning the signal in one embodiment comprises centering the carrier signal to 2.5 volts DC as this is in the center of the range for the ADC unit.

The ADC samples the analog voltage frequently. In this preferred embodiment the ADC samples the analog voltage every 2 microseconds.

The sampled analog voltage is converted to a 16 bit binary representation of the voltage.

The stream of 16 bit representations of the voltage ("digital image") pass to the decoder FPGA. In the preferred embodiment, the zero line crossings repeat approximately every 8.33 milliseconds and the transmitter sends out a carrier signal for approximately 8.3 milliseconds. For each 8.33 millisecond interval 6.4 milliseconds are sampled which translates to 3200 samples of 16 bit precision of the voltage of the carrier signal. As an implementation detail, the 6.4 millisecond sample starts approximately one millisecond after the zero crossing and ends approximately a millisecond before the next zero crossing as there is little coherent energy at or very near the zero crossing.

Figure 4:
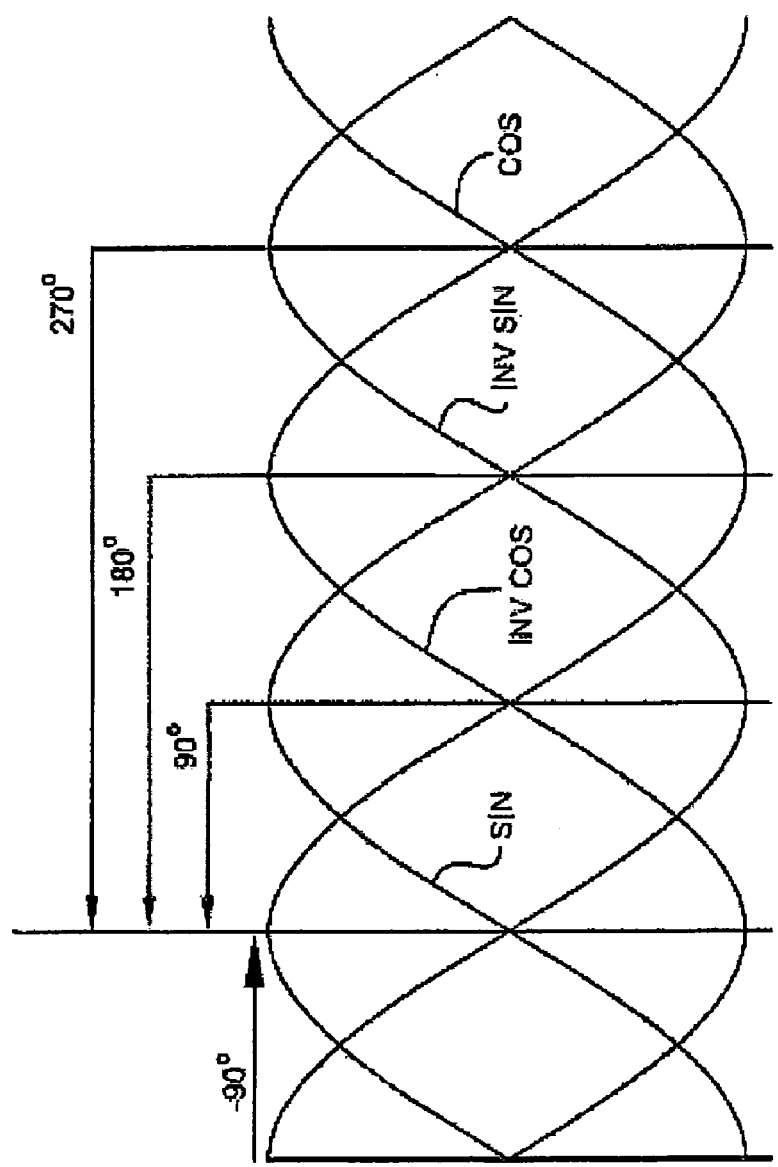
FIG. 4 provides an illustration of the relationship between sine, cosine, negative sine, and negative cosine as known in the prior art.

As an aside, FIG. 4 serves as a reminder that the addition of a phase shift of:

zero degrees to a cosine wave is a cosine wave 90 degrees to a cosine wave is a sine wave 180 degrees to a cosine wave is the product of cosine wave*−1) La negative cosine wave)

270 degrees (or negative 90 degrees) to a cosine wave is the product of (sine wave*−1) (a negative sine wave).

Figure 5:
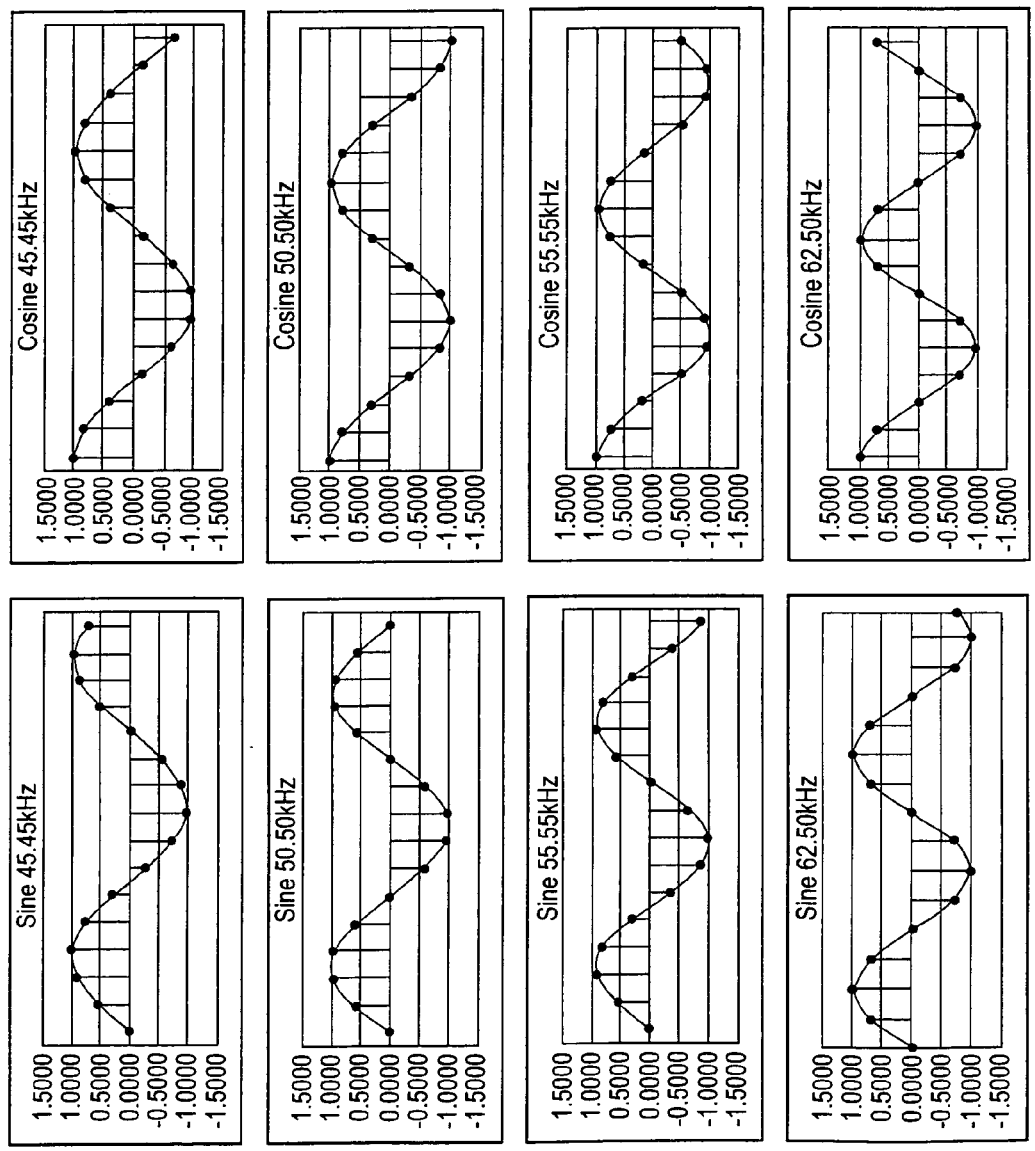
FIG. 5 illustrates the impact of frequency on the sampled pattern presented of sine and cosine waves during a fixed sampling period.

Based on a derivative of a local stable oscillator, a set of ideal values is created for the sine values for each of the four carrier frequencies. Thus, a sequence of numbers is generated to anticipate the values at 2 μsec intervals. A separate set of ideal values is created for the cosine values anticipated at the 2 μsec intervals for the four carrier frequencies. With the values for sine and cosine, the negative sine and negative cosine values are accessible. FIG. 5 illustrates the effect of frequency on the sine and cosine values expected during a fixed sampling period.

For each of the 3200 digital values gathered at 2 μsec intervals, the measured value is multiplied by the generated sine value for each of the four carrier frequencies for the corresponding time slot. These products are each added to an accumulator. The measured value is also multiplied by the generated cosine values for each of the four carrier frequencies and those products are added to other accumulators. In the preferred embodiment as operated in a 60 Hz environment, the set of measured values ("sampling window") is limited to 6.4 milliseconds of the 8.33 interval between zero crossings. Thus the first data value in the sampling window would be multiplied by the generated cosine value expected at 1 milliseconds into the zero crossing interval for that particular carrier frequency and by the generated sine value for 1 milliseconds into the zero crossing interval for that particular frequency. In one particular embodiment, the gross offset (of zero, 60, or 120 degrees) to account for phase leg differences is augmented by a fine offset in increments of a degree or less that can be used to shift the sampling window forward or back slightly with respect to the zero crossings of the power line voltage so as to improve the amount of energy received in the sample window as there is very little coherent energy near the zero crossing.

The purpose of the storage of accumulated products is to discern which of the 16 possible tuples is the best match (frequency, phase shift) for the incoming data stream. The effectiveness of this sort of accumulation is illustrated in FIG. 6.

To keep things simple, FIG. 6 focuses on discerning the phase shift for a single frequency. In order to provide an interesting range of numbers in a small table, the rows are based on 10 degree increments from zero to 180 degrees.

In a further attempt to introduce the concepts one layer at a time, FIG. 6 includes accumulators in accordance with an alternative embodiment of the present invention which would use sixteen accumulators rather than eight (as described below). Thus, for each of the four carrier frequencies, a set of generated values sine, cosine inverted sine, and inverted cosine would be multiplied against the sampled data and accumulated. The best match would be the accumulator with the largest positive value (shown in FIG. 6 as the accumulated value for sine which is a 90 degree phase shift from cosine as this is the closest to the 100 degree phase shift imposed in the example illustrated by FIG. 6). If the largest positive value did not exceed a prescribed threshold the burst will not be recognized as valid.

The set of sample data used in-FIG. 6 was created based on the following formula: (Cosine (input angle−(90 degrees phase shift+10 degrees offset))) multiplied by attenuation factor 0.567.

The set of manipulations purposefully distorted the cosine function shifted an intentional phase shift of 90 degrees as might be implemented by phase shift keying to show that this method works well even if the timing differences between components were to be off by 10 degrees. The attenuation factor was added to show that the results are not dependent on the measured values being approximately equal to the generated values.

As the sample data was based on the cosine shifted 100 degrees, it is not surprising that the data multiplied by the sine sequence provided the largest accumulation. Note that the difference is striking even after introducing noise from a phase offset of 10 degrees and attenuation. The next closest accumulation is less than a fifth of the total for the sine accumulation.

As the system is conveying binary information based on the difference in phase angle between successive transmissions (current phase angle minus previous phase angle), the value conveyed by the wave would be: A) 00 if the preceding signal was a sine wave, B) 01 if the preceding signal was a cosine wave C) 10 if the preceding signal was a negative sine wave and D) 11 if the preceding signal was a negative cosine wave.

A preferred embodiment does not have four accumulators per carrier frequency, but has only two. This two accumulator method is based on the knowledge that any sinusoidal can be expressed as the sum of a sine function and a cosine function. One accumulator for the products of the generated cosine wave values and the data stream. As noted in FIG. 6, this accumulator represents the In-Phase component (I) of the data stream with respect to the generated cosine wave data stream.

A second accumulator is used to store the products of the generated sine wave values and the data stream. As noted in FIG. 6, this accumulator stores the Quadrature Component (Q component). As is known in the art, the phase shift between a signal and a reference signal can be determined based on the arctan of (Q/I). As shown in FIG. 6, the arctan of the accumulators for Q and I based on the small samples used in the table yield a phase of 101.085 degrees off of a positive cosine wave. This result is very close to the 100 degrees expected as the sample data was created based on the use of an imposed phase shift of 90 degrees with an added phase shift of 10 degrees (90+10=100 degrees expected answer). It is important to stress that while the sample data did not have additional random noise that would tend to obscure the result, that this example was performed with only 19 pieces of sample data in contrast to the 3200 samples used in the preferred embodiment.

As an alternative to implementing the arctangent function, a preferred embodiment of the present invention scales the Q and I accumulations by shifting them both so that the larger of the two absolute values is shifted to make the most significant bit a 1. Thus, if using 15 bits are used for the magnitude and the leading bit used to convey sign, a pair of magnitudes of 000 0011 0101 1100 and 000 0001 1101 0010 both get shifted five places to the left to become 110 1011 1000 0000 and 011 1010 0100 0000. The two shifted values are compared to a lookup table that maps the various pair values to phase shift values through the use of an arctangent of (Q/I).

As the example uses a differential QPSK, the previous phase angle is subtracted from the current phase angle to discern the phase difference. This difference is normalized. Thus, if the phase difference is determined to be between −45 and +45 degrees, then the conveyed bits are translated as a binary 00. If the phase difference is determined to be between +45 degrees and +135 degrees then the conveyed bits are translated as binary 01. If the phase difference is determined to be between +135 degrees and +225 degrees then the conveyed bits are translated as binary 10. If the phase difference is determined to be between +225 degrees and +315 degrees then the conveyed bits are translated as binary 11.

In order to avoid treating noise as a valid burst, an acceptance threshold can be set for the absolute value of the accumulator so that absolute values of the accumulator values below a set threshold cause this measurement to be treated as not valid. If either the I or Q accumulator has an absolute value above the threshold, then the burst is treated as valid.

Hardware Implementation

Figure 7:
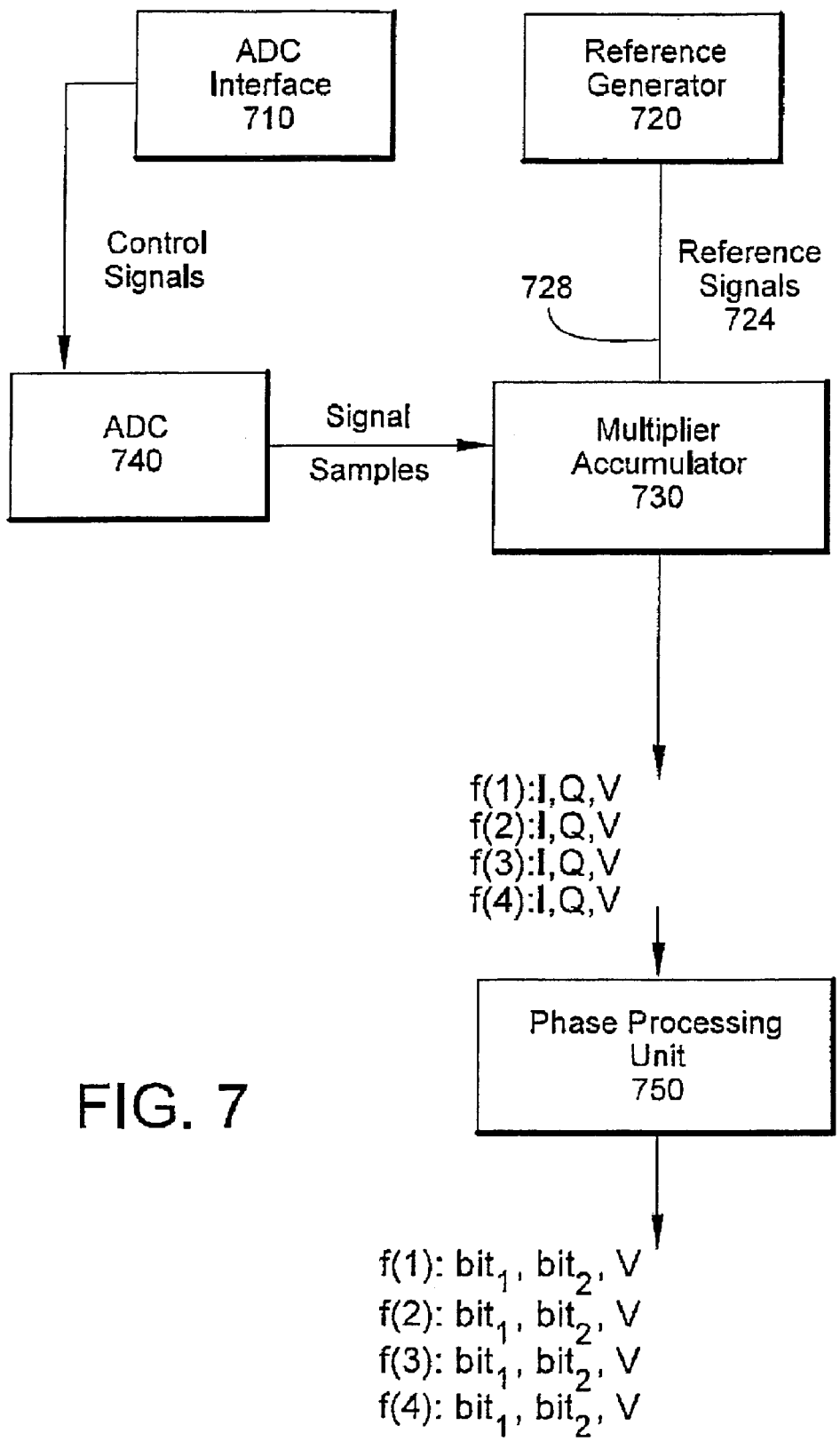
FIG. 7 provides an illustration of the logical modules for one embodiment implementing the present invention.

A preferred embodiment implements the decoder in a Field Programmable Gate Array (FPGA) such as an ALTERA™ EP1K50TC144-2. The logical modules of the preferred embodiment are represented in FIG. 7. In this embodiment, the functions beyond the ADC are performed within the FPGA although the invention could be implemented with other allocations of functions.

The ADC interface 710 generates the signals required for the operation of the ADC. The ADC interface provides the information on when to start acquiring the 6.4 milliseconds of data shortly after the zero crossing. The ADC interface also provides the clock signal for the: ADC. The clock signals can be provided by a divide. down using a standard off-the-shelf TV crystal and the addition of the 0 degree, 60 degree or 120 degree delays relative to the detected zero crossing.

The Reference Generator 720 generates the reference signals 724. As described above, these are sampled sine and cosine signals represented by binary values. The Cosine signal is used as the reference for the I channel and the Sine signal is used as the reference for the Q channel of the Multiplier Accumulator. For a system with four channels (frequencies) there are a total of eight sequences. The eight sequences are multiplexed onto a common bus 728 in order to facilitate time multiplexing of the processing functions.

The Multiplier Accumulator 730 (MAC) multiplies the signal samples from the ADC 740 with the corresponding I and Q reference samples generated by the reference generator. The resulting I and Q products are accumulated in the I and Q accumulators over the accumulation interval. The MAC functions are time-shared eight ways by the I and Q channels for each of the four transmitter frequencies. The MAC also compares the accumulator outputs with a set minimum threshold for the absolute value of the accumulator to determine if a burst is to be declared a valid burst.

The Phase Processing Unit 750 (PPU) receives the I and Q accumulation results from the MAC for each of the transmitter frequencies. The I and Q magnitudes from the accumulation results are scaled by shifting up the bits until the Most Significant Bit (MSB) is unequal to the next lower bit. The MSB is used to convey the sign of the accumulated result with the MSB conveying a zero when the accumulation result is positive and a one when the result is negative (two's complement representation convention).

The scaled values of the I-Q register pair represent the orthogonal components of a vector. These components provide sufficient information to determine the value of the angle of the vector which is the phase angle needed in order to obtain the conveyed digital bits.

The I and Q components are used in a three stage phase lookup table to obtain the phase of the received burst relative to the generated sine wave.

In the first stage the sign bits (highest order bits) are checked to determine whether the magnitude bits (the bits other than the highest order bit) are complemented/not complemented and swapped/not swapped. Complemented as used in this application refers to the binary manipulation known as 2's complement. One or both of the I and Q values can be complemented as part of the transformation from quadrants 2, 3, or 4 to quadrant 1. Swapping is the exchange of the I and Q values. The possible combinations of complemented/not complemented and swapped/not swapped effectively rotate the I-Q vector into the first of four quadrants. By performing this rotation, the size of the table needed to translate the I-Q vector to a phase angle is reduced by 75%. By convention, the quadrants are numbered in counterclockwise order with quadrant 1 having both I and Q positive. The x axis is used for 1 and the y axis is used for Q. This is illustrated in FIG. 8 which has four vectors, each rotated approximately 10 degrees off the quadrant reference line.

| Original Quadrant | I term | Q term | Treatment to rotate to Quadrant 1 | | After Transformation |
|---|---|---|---|---|---|
| | | | Complement? | Swap I and Q? | original I, Q becomes: |
| 1 | Positive | Positive | Neither | No | I, Q |
| 2 | Negative | Positive | I | Yes | Q, −I |
| 3 | Negative | Negative | Q and I | No | −I, −Q |
| 4 | Positive | Negative | Q | Yes | Q, I |

Figure 8:
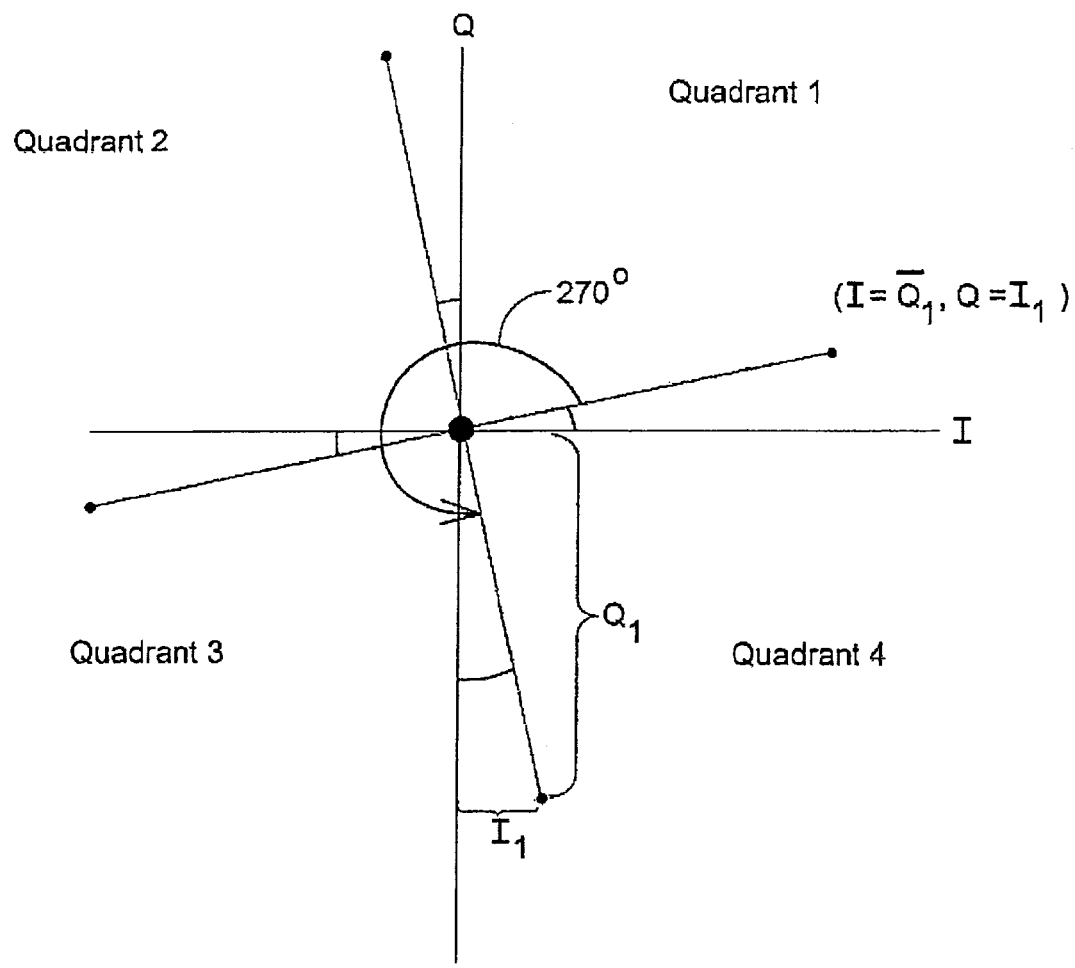
FIG. 8 illustrates the transforms from quadrants 2, 3, and 4 to quadrant 1 and the transform of the result of the arctan of the quotient of Q/I back to the original angle.
Figure 9:
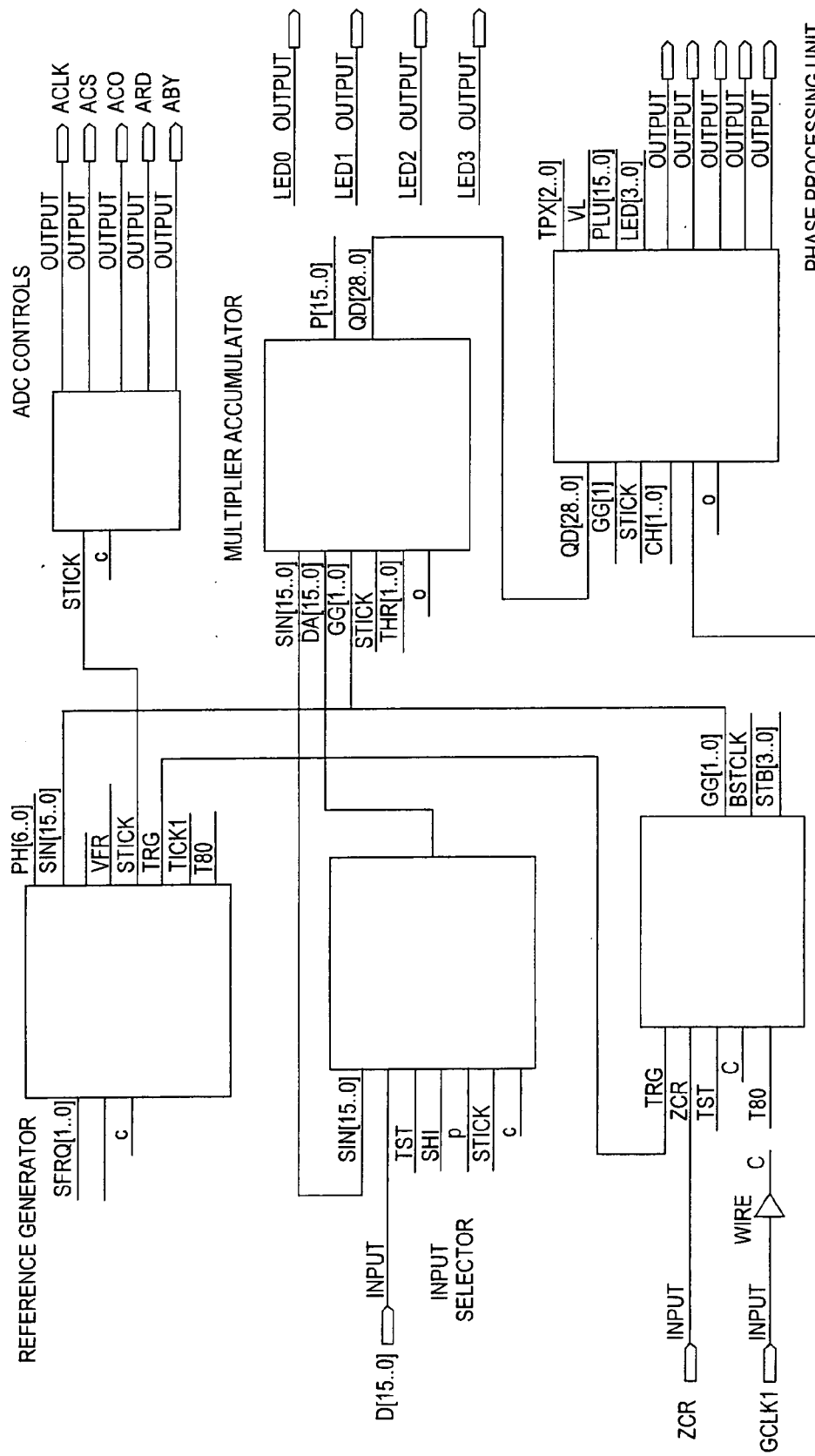
FIG. 9 provides a top level representation of one particular implementation of the present invention on. a Field Programmable Gate Array (FPGA).
Figure 10:
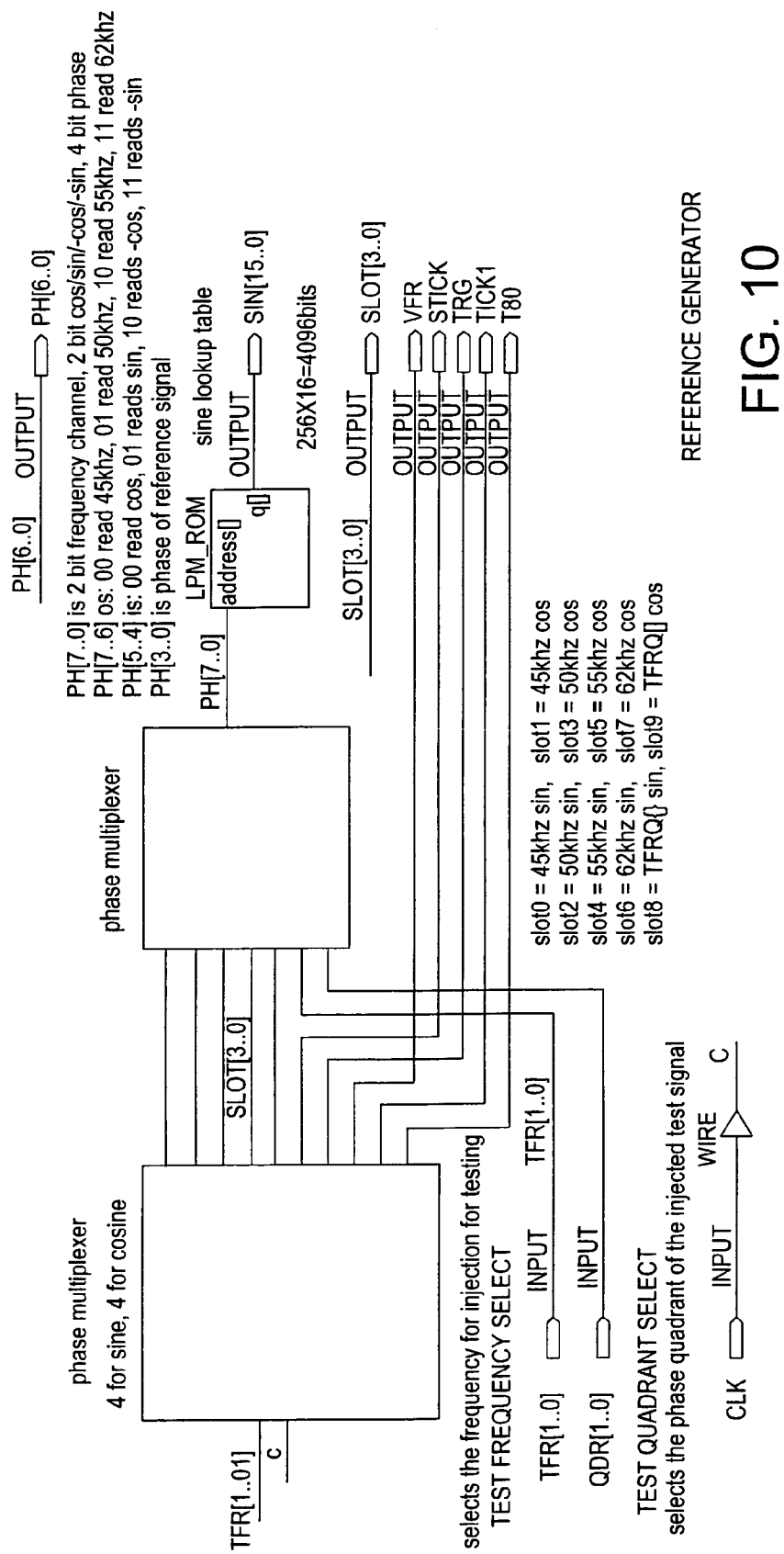
FIG. 10 provides details regarding one particular implementation of the reference generator used in the present invention.
Figure 11:
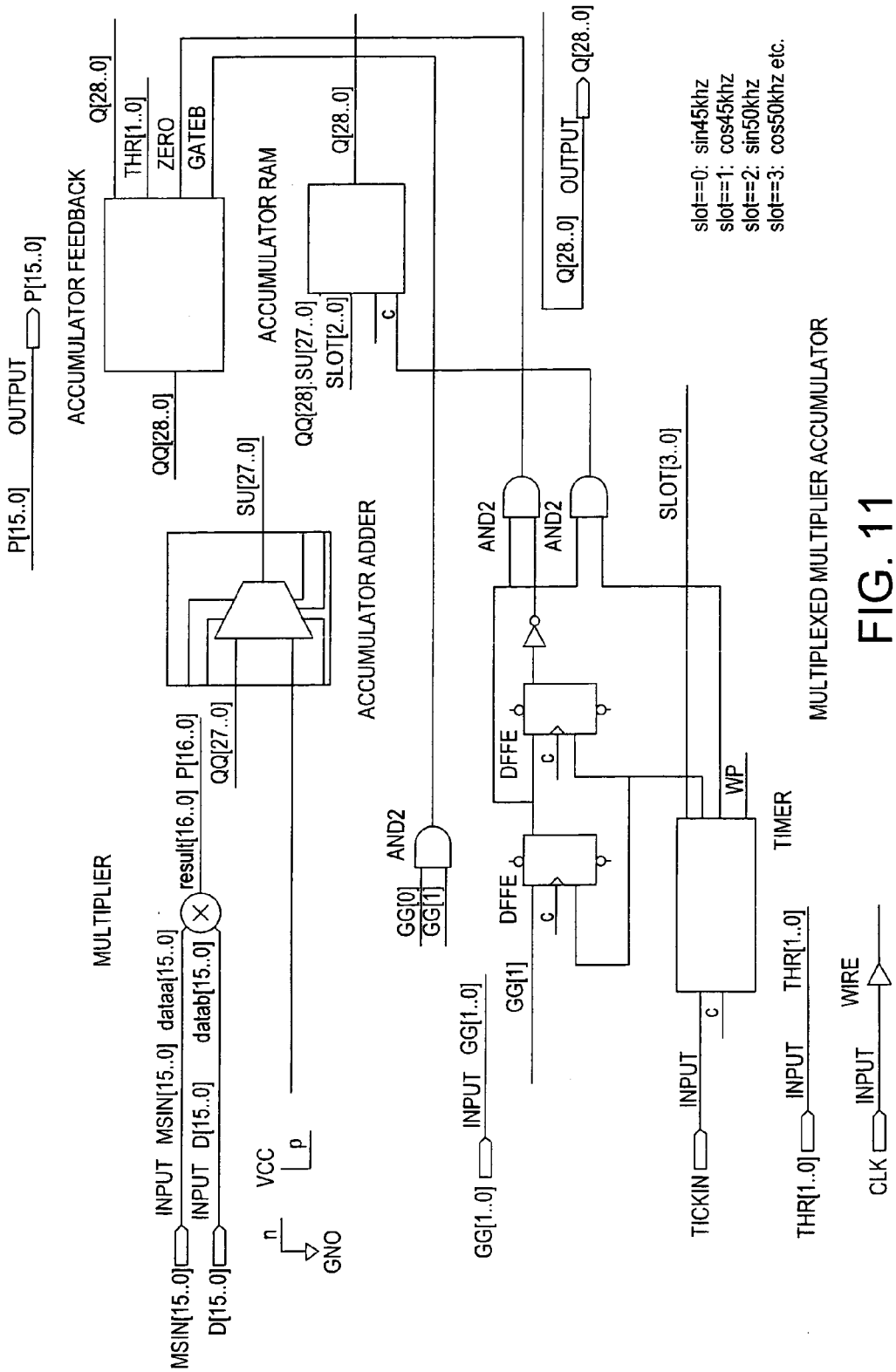
FIG. 11 provides details regarding one particular implementation of the multiplexed multiplier accumulator used in the present invention.
Figure 12:
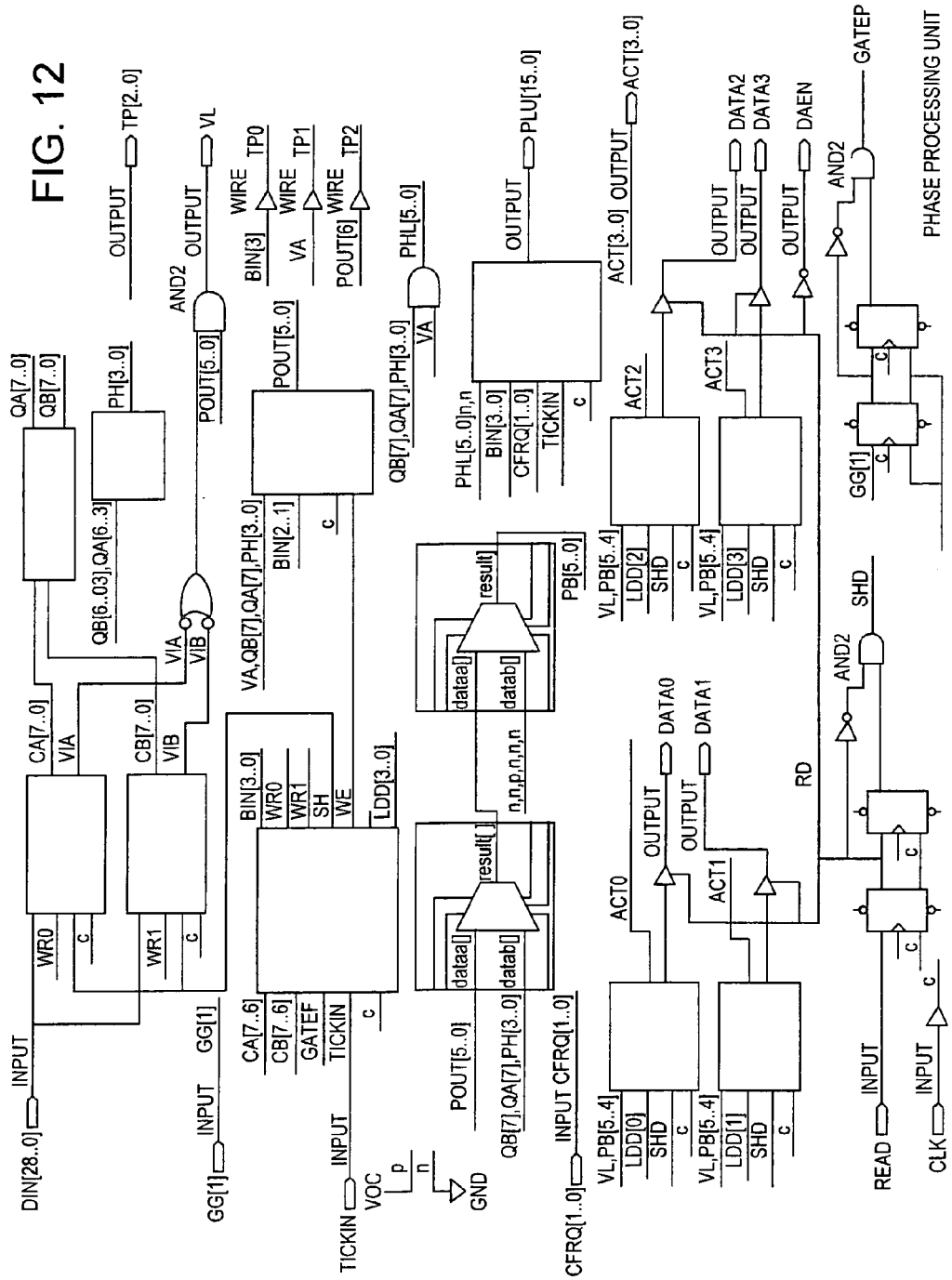
FIG. 12 provides details regarding one particular implementation of the phase processing unit used in the present invention.

As an example of the transforms, the angle in quadrant four shown in FIG. 8 can be translated into quadrant 1 by taking the initially negative value of Q and performing a two's complement operation to obtain the inverse of the value. If the complement for the original value of Q is swapped with the original value of I, the result is two positive components for the vector which places it in quadrant 1.

After the phase angle has been translated into quadrant 1, the second stage performs the actual arc tangent lookup for the pair of I, Q values against a table for a range from zero to 90 degrees. While this step could be done with a single value of Q/I, dividers are cumbersome to implement so it is more convenient to pass a pair of values to the look-up table rather than divide. Those of skill in the art could choose to implement the present invention using a divider and passing a single value to an appropriately modified look-up table.

The third stage combines the original sign bits with the 90 degree phase bits to reconstitute the phase representation over the full range of zero to 360 degrees.

| Original Quadrant | Original I term | Original Q term | Treatment to Convert the Quadrant 1 arctan result to correct final result. |
|---|---|---|---|
| 1 | Positive | Positive | None (add 0 degrees) |
| 2 | Negative | Positive | Add 90 degrees in order to make this conversion |
| 3 | Negative | Negative | Add 180 degrees in order to make this conversion |
| 4 | Positive | Negative | Add 270 degrees in order to make this conversion |

The current phase value is stored for use with decoding the next burst. To continue with the example of the quadrant 4 vector, the arctan of pair the Q/I pair after the transform to place the angle into quadrant 1 would be 10 degrees. The addition of 270 degrees of counterclockwise rotation to 10 degrees accurately converts the intermediate value to the correct value.

The present code value that conveys the binary bits in this particular modulation scheme is the current phase angle minus the previous phase angle as this is the convention used by the encoders used at the transmitter end. The encoding and decoding process could of course be implemented so that binary bits are conveyed based on the difference between the previous phase angle minus the current phase angle. The present invention could be modified slightly to accommodate that convention. The conversion of phase angle difference to binary is as follows: A) zero degrees plus or minus 45 degrees is decoded as binary 00; B) ninety degrees plus or minus 45 degrees is decoded as binary 01; C) 180 degrees plus or minus 45 degrees is decoded as binary 10; and D) 270 degrees plus or minus 45 degrees is decoded as binary 11.

The two bit binary output decoded from the burst phase shift and the validity bit generated by the MAC based on exceeding the required minimum absolute value for the accumulator are loaded into a three bit shift register. The three bit shift register can be shifted and read by the system processor.

This completes the decoding of one channel in the PPU. The same process is repeated sequentially for the other channels.

Figure 13:
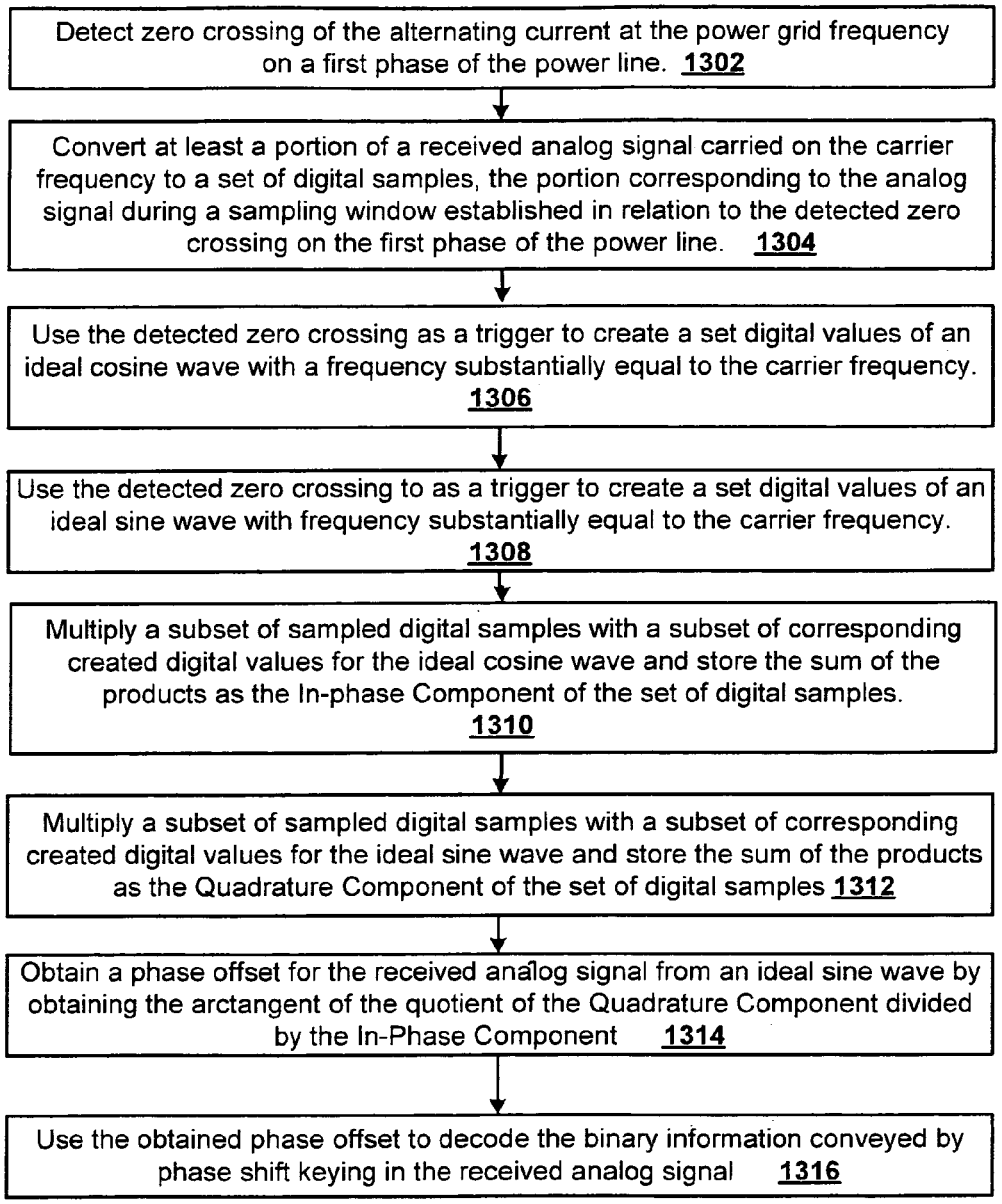
FIG. 13 is a flowchart of an example of a method for decoding a phase shift keying signal carried on a carrier frequency over a power line operating at a power grid frequency.

FIG. 13 is a flowchart of an example of a method for decoding a phase shift keying signal carried on a carrier frequency over a power line operating at a power grid frequency. At step 1302, a carrier signal being transmitted on a first phase of the power line is received and a zero crossing of the first phase of the power line signal is detected. At step 1304, at least a portion of the received carrier signal is converted to digital samples. The portion of the signal corresponds to the carrier signal sampled during a window of time that is based on the detected zero crossing. At step 1306, the zero crossing is used as a trigger to generate a set of digital values that form an ideal cosine wave with a frequency substantially equal to the carrier frequency. At step 1308, the zero crossing is used to create a set of digital values that form an ideal sine_wave with a frequency substantially the same as the carrier frequency. At step 1310, the digital samples are multiplied by corresponding generated digital values representing the ideal cosine wave. The products are summed and the sum is stored as an in-phase component of the set of digital samples. At step 1312, the digital samples are multiplied by corresponding generated digital values representing the ideal sine wave. The products are summed and the sum is stored as the quadrature component of the set of digital samples. At step 1314, the arctangent function of the quotient of the quadrature component value divided by the in-phase component value is calculated to arrive at a phase offset for the received analog signal relative to the ideal cosine wave. The phase offset is then used to decode the binary information from the phase shift keying in the received analog signal input.

Figure 14:
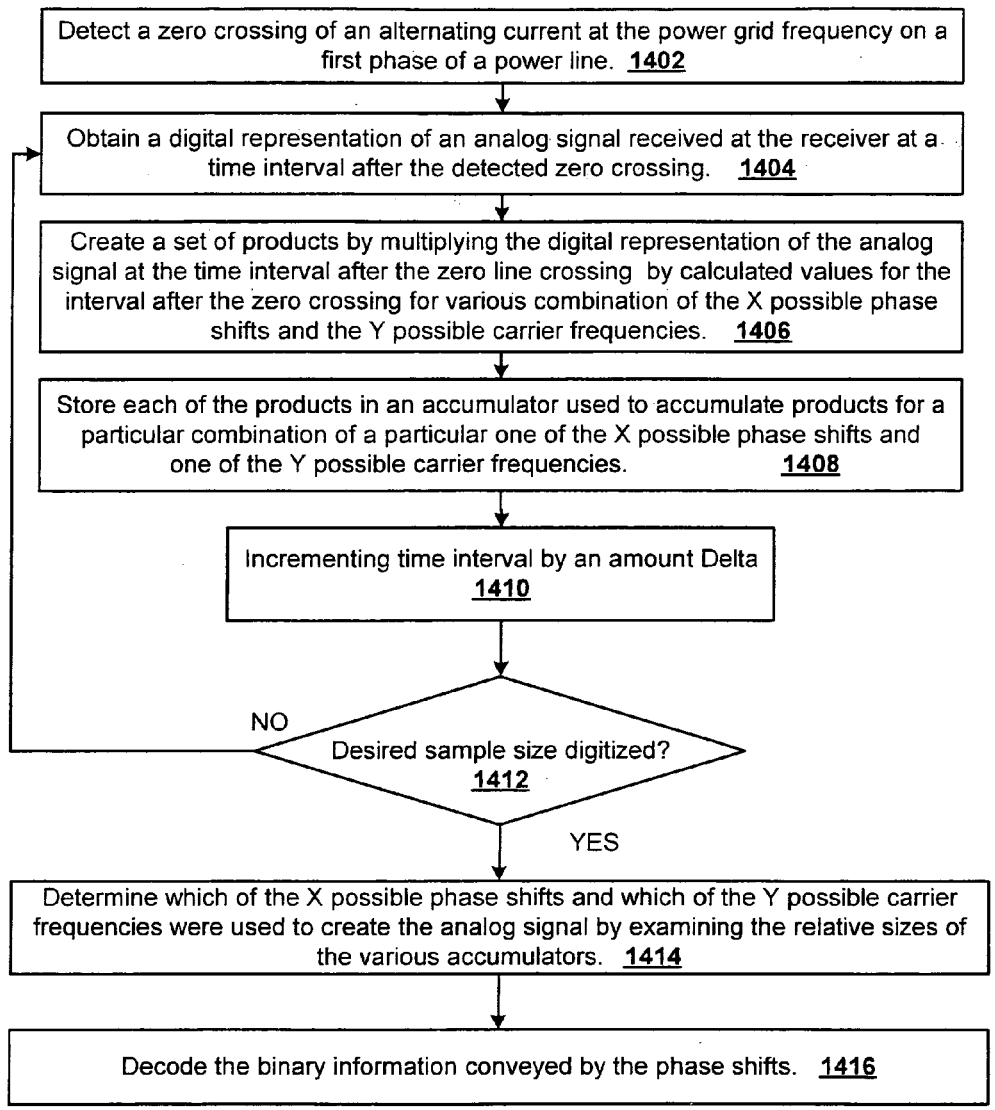
FIG. 14 is a flowchart of an example of a method for matching an incoming analog signal conveying one of X possible phase shifts on one of Y possible carrier frequencies.

FIG. 14 is a flowchart of an example of a method for matching an incoming analog signal conveying one of X possible phase shifts on one of Y possible carrier frequencies. The method in FIG. 14 also detects a zero crossing of the alternating current on a first phase of the power line as shown in step 1402. The analog signal is converted to digital samples and stored. At step 1404, a subset of the digital samples representing the levels of the analog signal received during a time interval after the zero crossing is retrieved for analysis. The time interval may be specified as a size of an array of samples where the size multiplied by the sampling. rate of the analog-to-digital conversion equals the desired time interval. At step 1406, the. digital samples in the time interval are multiplied by generated digital ideal values for the time interval. The products are generated for various combinations of X possible phase shifts and Y possible carrier frequencies. At step 1408, the products are stored and summed in an accumulator corresponding to one of the X possible phase shifts and one of the Y possible carrier frequencies. At step 1410, the time interval is incremented by a number, delta, to obtain a next subset of samples. At decision block 1412, the size of the samples processed is checked to determine if a desired set of samples have been processed. If not, steps 1404, 1406 and 1408 are repeated for the set of samples in the time interval designated by delta. If enough samples have been processed, control transfers to step 1414 to determine which of the X possible phase shifts and which of the Y possible carrier frequencies were used to generate the analog signal according to the sizes of the accumulators. The phase shifts are then used to decode the binary information conveyed by the signal at step 1416.

Alternative Embodiments

The example provided above relied upon a means for synchronizing the actions on the transmitter and receiver. The particular means used was to detect the zero line crossing of the power line signal (such as 50 or 60 Hz). Those of skill in the art will recognize that other means for providing synchronized operation of the transmitter and receiver can be used such as synchronizing the clocks in the transmitter and receiver. Synchronizing clocks for a number of transmitters with a receiver is more work than synchronizing a single transmitter with the receiver but still possible.

Another way to provide coordination of the receiver and the transmitter in order to implement the present method is to transmit an extended pattern (no signal, alternating signal, et cetera) and then indicate the start or imminent start of a transmission burst by ending the extended pattern.

This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Those skilled in the art will recognize that the methods and apparatus of the present invention have many applications and that the present invention is not limited to the specific examples given to promote understanding of the present invention. Moreover, the scope of the present invention covers the range of variations, modifications, and substitutes for the system components described herein, as would be known to those of skill in the art.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

What is claimed is:

1. A method of decoding a phase shift keying signal carried on a carrier frequency over a power line operating at a power grid frequency, the method comprising the steps of:

detecting a zero crossing of the alternating current on a first phase of the power line operated at the power grid frequency;

converting at least a portion of a received analog signal carried on the carrier frequency to a set of digital samples, the portion corresponding to the analog signal during a sampling window established in relation to the detected zero crossing on the first phase of the power line;

using the detected zero crossing as a trigger to create a set of digital values of an ideal cosine wave with a frequency substantially equal to the carrier frequency;

using the detected zero crossing to create a set of digital values of an ideal sine wave with frequency substantially equal to the carrier frequency;

multiplying a subset of digital samples with a subset of corresponding created digital values for the ideal cosine wave and storing the sum of the products as the In-Phase Component of the set of digital samples;

multiplying a subset of digital samples with a subset of corresponding created digital values for the ideal sine wave and storing the sum of the products as the Quadrature component of the set of digital samples;

obtaining a phase offset for the received analog signal from an ideal cosine wave by obtaining the Arctangent of the quotient of the Quadrature component divided by the In-Phase component; and using the obtained phase offset to decode the binary information conveyed by phase shift keying in the received analog signal.

2. The method of claim 1 wherein the subset of digital samples is the entire set of digital samples corresponding to the analog signal during the sampling window.

3. The method of claim 1 wherein the step of using the obtained phase offset to decode the binary information converts the phase offset to a particular binary value.

4. The method of claim 1 wherein the detected zero crossing is the $n^{th}$ detected zero crossing and the step of using the obtained phase offset to decode the binary information compares the obtained phase offset measured after the $n^{th}$ zero crossing to a stored value for a phase offset measured after the n−1 zero crossing.

5. The method of claim 1 wherein the step of converting at least a portion of a received analog signal carried on the carrier frequency to a set of digital samples converts a set of samples of the analog signal taken at predictable intervals beginning a time interval A after a detected zero crossing and ending after a time interval B so that the digital samples are not obtained close to a zero crossing where there is little coherent energy.

6. The method of claim 5 wherein step of converting at least a portion of a received analog signal carried on the carrier frequency to a set of digital samples is done in connection with an applied offset so that the set of digital samples from the sampling window are offset to compensate for a transmitter operating on a second phase of the power line different from the first phase.

7. The method of claim 5 wherein the portion of received analog signal carried on the carrier frequency converted to a set of digital samples is a set of samples taken at 2 microsecond intervals starting approximately one millisecond after a detected zero crossing and ending approximately 6.4 milliseconds after starting.

8. The method of claim 1 wherein the arctangent of the quotient of the Quadrature component divided by the In-Phase component is achieved through the use of a look-up table to eliminate the need for a divider circuit.

9. The method of claim 8 wherein the values of the I and Q components are swapped and complimented as needed so that 360 degrees of possible arctangent angles are handled by a look-up table with entries for a 90 degree range of values.

10. A method of matching an incoming analog signal conveying one of X possible phase shifts on one of Y possible carrier frequencies by:

A. detecting a zero crossing of an alternating current at a power grid frequency on a first phase of a power line;

B. obtaining a digital representation of an analog signal received at the receiver at a time interval after the detected zero crossing;

C. creating a set of products by multiplying the digital representation of the analog signal at the time interval after the zero line crossing by calculated values for the time interval after the zero crossing for various combinations of the X possible phase shifts and the Y possible carrier frequencies;

D. storing each of the products in an accumulator used to accumulate products for a particular combination of a particular one of the X possible phase shifts and one of the Y possible carrier frequencies;

E. incrementing the time interval by an amount Delta;

F. repeating steps B, C, D, and E until the desired set of samples from that analog signal have been digitized, leading to the accumulation of products of the digitized analog signal multiplied by corresponding calculated values for the relevant intervals;

G. discerning which of the X possible phase shifts and which of the Y possible carrier frequencies were used to create the analog signal by examining the relative sizes of the various accumulators; and H. decoding the binary information conveyed by the phase shift.

11. The method of claim 10 wherein the receiver detects zero crossings of the alternating current on the first phase of the power line but offsets the sampling window to sample a signal created by a transmitter connected to a second phase of the power line wherein the second phase is not the same as the first phase.

12. The method of claim 10 wherein the step of discerning which of the X possible phase shifts and which of the Y possible carrier frequencies were used to create the analog signal includes a comparison of the accumulator values against a minimum value and:

if the largest accumulator value is below the minimum value then dismissing the analog signal sent between two zero crossings as an invalid burst;

else accepting the analog signal sent between two zero crossings as a valid burst for decoding the binary information conveyed by the phase shift.

13. The method of claim 10 wherein the step of discerning which of the X possible phase shifts and which of the Y possible carrier frequencies were used to create the analog carrier detects that a first carrier frequency with a first phase shift and a second carrier frequency different from the first carrier frequency and a second phase shift possibly equal to the first phase shift were both conveyed within the sampled period and received in the incoming analog signal.

14. A receiver for decoding binary information conveyed by phase shift keying over a power line carrier, the receiver comprising:

a zero crossing detector for detecting a set of zero crossings of an alternating current at a power grid frequency on a first phase of the power line;

an input for receiving an analog signal obtained from a pick-up coil connected to one of the phases of the power line carrier;

a digital converter to convert a portion of the analog signal received during a sampling window into a series of digital values, the start of the sampling window set based on the detection of a zero crossing and the sampling window set to capture the analog signal sent between two zero crossings of the alternating current at the power grid frequency on the power line phase carrying the analog signal;

a multiplier/accumulator module for:

multiplying a series of number pairs, each number pair consisting of a digital value a certain offset into the sampling window and a digital value of an ideal cosine wave at a first specific frequency expected at that offset into the sampling window for a transmitter using that specific frequency to convey information via phase shift keying;

accumulating as the I value for that first specific frequency, the sum of the products from the multiplication of the sampled digital values and the corresponding ideal cosine wave values for the first specific frequency;

multiplying a second series of number pairs, each number pair consisting of the digital value a certain offset into the sampling window and a digital value of an ideal sine wave at a first specific frequency expected at that offset into the sampling window for a transmitter using that specific frequency to convey information via phase shift keying;

accumulating as a Q value for that first specific frequency the sum of the products from the multiplication of the sampled digital values and the corresponding ideal sine wave values; and a means for converting the I and Q values for a specific frequency into a conveyed phase shift for the analog signal received during that sampling window for that specific frequency to decode the binary information conveyed by the phase shift.

15. The receiver of claim 14 wherein the means for converting the values in the I and Q values for a specific frequency to a conveyed phase shift include use of a divider circuit to obtain a value for the Q divided by I.

16. The receiver of claim 14 wherein the means for converting the I and Q values for a specific frequency to a conveyed phase shift include the use of a look-up table.

17. The receiver of claim 14 wherein the sampling window can be set for a delay offset to increase the interval between the detection of a zero crossing by the zero crossing detector and the start of the sampling window such that an analog signal created by a remote transmitter based on a transmitter with a zero crossing detector monitoring a second phase of the power line where the second phase is different from the first phase.

18. The receiver of claim 14 wherein the receiver multiplier/accumulator module also acts to accumulate I and Q values for a second specific frequency not equal to the first specific frequency by:

multiplying a third series of number pairs, each number pair consisting of the digital value a certain offset into the sampling window and a digital value of an ideal cosine wave at a second specific frequency expected at that offset into the sampling window for a transmitter using that specific frequency to convey information via phase shift keying;

accumulating as the I value for that second specific frequency, the sum of the products from the multiplication of the sampled digital values and the corresponding ideal cosine wave values for the second specific frequency;

multiplying a fourth series of number pairs, each number pair consisting of a digital value a certain offset into the sampling window and a digital value of an ideal sine wave at a second specific frequency expected at that offset into the sampling window for a transmitter using that specific frequency to convey information via phase shift keying;

accumulating as a Q value for that second specific frequency the sum of the products from the multiplication of the sampled digital values and the corresponding ideal sine wave values;

such that the means for converting the I and Q values for a specific frequency into a conveyed phase shift for the analog signal received during that sampling window for that specific frequency can provide a first phase shift received on the first specific frequency during a sampling window offset from a particular zero crossing and a second phase shift received on the second specific frequency during a sampling window offset from the same particular zero crossing.

19. The receiver of claim 18 wherein offset used for the sampling window offset from a particular zero crossing in order to obtain the phase shift conveyed by the first specific frequency is not the same as the offset used for the sampling window offset from the same particular zero crossing in order to obtain the phase shift conveyed by the second specific frequency as the transmitter using the first specific frequency is on a first phase of power line and the transmitter using the second specific frequency is on a second phase of power line.

20. The receiver of claim 14 wherein the means for converting the I and Q values for a specific frequency into a conveyed phase shift includes a requirement that the absolute value for at least one of either the I or the Q component exceeds a certain threshold value to help ensure that information was actually conveyed on that specific frequency during that sampling window.

* * * * *

UNITED STATES PATENT AND TRADEMARK OFFICE
CERTIFICATE OF CORRECTION

PATENT NO. : 7,242,729 B1  
APPLICATION NO. : 11/113843  
DATED : July 10, 2007  
INVENTOR(S) : Heistermann et al.

Page 1 of 1

It is certified that error appears in the above-identified patent and that said Letters Patent is hereby corrected as shown below:

Column 2, line 14, the period between the words "on" and "a" needs to be deleted.

Column 3, line 27, delete the term "Hz" that appears before the number "60".

Column 4, line 58, add an open parentheses before the word "cosine".

Column 4, line 59, replace the term "La" with a --(a--.

Column 5, line 52, delete the dash between the words "in" and "FIG."

Column 6, line 7, insert the word --sine-- between the words "the" and "wave".

Column 12, line 41, insert a comma after the word "value".

Signed and Sealed this

Fourth Day of November, 2008

JON W. DUDAS  
*Director of the United States Patent and Trademark Office*